United States Patent
Shang et al.

(10) Patent No.: US 9,831,945 B2
(45) Date of Patent: Nov. 28, 2017

(54) METHODS, APPARATUSES AND SYSTEM FOR MONITORING ROADM OPTICAL NETWORK

(71) Applicant: ZTE Corporation, Shenzhen (CN)

(72) Inventors: Yingchun Shang, Shenzhen (CN); Feng Hua, Shenzhen (CN); Bailin Shen, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 14/784,086

(22) PCT Filed: Oct. 25, 2013

(86) PCT No.: PCT/CN2013/086000
§ 371 (c)(1),
(2) Date: Oct. 13, 2015

(87) PCT Pub. No.: WO2014/166233
PCT Pub. Date: Oct. 16, 2014

(65) Prior Publication Data
US 2016/0065303 A1    Mar. 3, 2016

(30) Foreign Application Priority Data

Apr. 11, 2013  (CN) .......................... 2013 1 0126295

(51) Int. Cl.
*H04B 10/077* (2013.01)
*H04J 14/02* (2006.01)
*H04Q 11/00* (2006.01)

(52) U.S. Cl.
CPC ........ *H04B 10/0773* (2013.01); *H04J 14/021* (2013.01); *H04J 14/0272* (2013.01);
(Continued)

(58) Field of Classification Search
USPC .......................................................... 398/34
See application file for complete search history.

(56) References Cited

U.S. PATENT DOCUMENTS

2007/0264011 A1   11/2007   Sone
2008/0080865 A1    4/2008   Muro
(Continued)

FOREIGN PATENT DOCUMENTS

CN    102316389 A    1/2012
CN    102546517 A    7/2012
(Continued)

OTHER PUBLICATIONS

International Search Report for corresponding application PCT/CN2013/086000 filed Oct. 25, 2013 ; dated Feb. 20, 2014.
(Continued)

*Primary Examiner* — David Payne
*Assistant Examiner* — Omar S Ismail
(74) *Attorney, Agent, or Firm* — Cantor Colburn LLP

(57) ABSTRACT

Provided are methods, apparatuses and a system for monitoring a Reconfigurable Optical Add Drop Multiplexer (ROADM) optical network. The method includes: loading, in an optical signal at a sending end, a wavelength label frequency and attribute information of a channel used for transmitting the optical signal; sending the wavelength label frequency and/or the attribute information; receiving, at a monitoring end, the optical signal and acquiring, from the optical signal, the wavelength label frequency and/or the attribute information of the channel used for transmitting the optical signal; and monitoring the ROADM optical network according to the wavelength label frequency and/or the attribute information. The technical solution solves the technical problem in related art that the ROADM optical net- (Continued)

work cannot be effectively monitored, and achieves the effective monitoring of the ROADM optical network.

21 Claims, 5 Drawing Sheets

(52) U.S. Cl.
CPC . *H04Q 11/0066* (2013.01); *H04Q 2011/0077* (2013.01); *H04Q 2011/0083* (2013.01)

(56) References Cited

U.S. PATENT DOCUMENTS

| | | | |
|---|---|---|---|
| 2009/0046738 A1* | 2/2009 | Lee | H04Q 11/0062 370/464 |
| 2010/0027415 A1* | 2/2010 | So | H04L 43/0811 370/225 |
| 2011/0236013 A1* | 9/2011 | Gazzola | H04J 14/0258 398/5 |
| 2012/0224851 A1* | 9/2012 | Takara | H04B 10/0793 398/45 |
| 2013/0230316 A1* | 9/2013 | Hussain | H04J 14/0272 398/34 |
| 2013/0308945 A1* | 11/2013 | Dhillon | H04Q 11/0003 398/48 |

FOREIGN PATENT DOCUMENTS

| | | |
|---|---|---|
| CN | 102624479 A | 8/2012 |
| CN | 102710323 A | 10/2012 |
| EP | 2293498 A1 | 3/2011 |
| JP | 2009206707 A | 9/2009 |

OTHER PUBLICATIONS

European Search Report EP 13 88 1898; Report dated Mar. 18, 2016.

* cited by examiner

```
Acquiring a wavelength label frequency carried in an optical signal
and/or attribute information of a channel used for transmitting the      S202
                        optical signal
```

```
Monitoring the ROADM optical network according to the                    S204
wavelength label frequency and/or the attribute information
```

METHODS, APPARATUSES AND SYSTEM FOR MONITORING ROADM OPTICAL NETWORK

TECHNICAL FIELD

The present disclosure relates to the field of communications, and in particular to methods, apparatuses and a system for monitoring a Reconfigurable Optical Add Drop Multiplexer (ROADM) optical network.

BACKGROUND

ROADM enables the drop, add and direct-through of channel wavelengths locally through software configuration, and enhances the transmission flexibility of optical network services. ROADM systems in the related art have a Colourless Directionless Contentionless (CDC) function. The traditional wavelength division multiplex system employs a fixed grid technology, in which a channel grid generally is fixed to 50 GHz or 100 GHz. The beyond 100 GHz transmission technology generates a flexible grid (or gridless) requirement, that is to say, the width of the channel grid is flexible so as to adapt to wavelength division multiplex transmission requirements of different modulation codes and different ratios. The CDC function of the ROADM evolves to a Colourless Directionless Contentionless Gridless (CDCG) or Colourless Directionless Contentionless Flexible (CDCF) function. The flexible grid technology has been primarily standardized by the International Telecommunication Union-Study Group 15 (ITU-SG15) according to G.694.1 standard in February, 2011, and the internal release of the draft standard document is V1.2. The frequency-slot nominal central frequency is specified to be 193.1+n× 0.00625, where n is an integer; the frequency width is specified to be 12.5 GHz×m, where m is a positive integer. For convenient description, generally the ROADM system employing a flexible grid technology is called a Flex ROADM system for short. As shown in FIG. 1, in a fixed-grid network, the spacing between two adjacent channels of a wavelength bearing services of different rates is fixed to 50 GHz or 100 GHz; meanwhile, each wavelength is allocated with a fixed spectrum bandwidth resource of 50 GHz or 100 GHz. At this time, the wavelength bearing services of different rates is expressed by the central frequency of f=193.1+n×C.S defined by ITU-TG.694.1 only (C.S is the abbreviation of Channel Spacing, which indicates the fixed spacing between two adjacent channels; n is an integer; n×C.S represents an offset relative to 193.1 THz). However, in a flexible-grid optical network, high-speed services can be allocated with more spectrum bandwidth resources according to the actual condition, and low-speed services are allocated with fewer but sufficient spectrum resources; in this way, the bandwidth utilization of network is greatly improved. However, in high-speed services, one channel might include one or more subcarriers, which may be allocated on a continuous spectrum or a discontinuous spectrum. As shown in FIG. 1, one spectrum bandwidth is 8×12.5 GHz, including 4 continuous subcarriers, each subcarrier being of 25 GHz spectrum bandwidth. Due to the CDC complexity in the ROADM system, when high-speed service spectrum is transmitted in the Flex ROADM system, problems such as subcarrier loss, subcarrier being allocated to an error path, incomplete filtering or mutual conflict of subcarriers are easy to occur.

Different from the traditional optical network, the beyond 100 GHz optical transport network not only introduces the flexible grid technology, but also possesses a multi-carrier optical transmission technology and a higher Digital Signal Processor (DSP) processing capability, and thus has a configurable/programmable feature. The programmable feature means changes can be made according to requirements, for example, different spectrum efficiencies and compensation algorithms can be selected according to different link states at the line side of the system, a wavelength selection component in the ROADM node of the system selects different grid widths and filtering shapes according to different signal spectrum widths and concatenation levels. The receiving end in the system selects a corresponding DSP algorithm according to different Baud rates and modulation formats. The above-mentioned configuration information is transmitted to each node of the system by a network management system. When the sending side configuration (such as modulation format and subcarrier multiplexing mode) of the sending end of the line side of the system is changed by the network management system according to the link state, correspondingly, the network management system also needs to change the configuration of each ROADM node and the receiving end in the link. The ROADM optical network uses the network management system to configure all nodes in the optical network. These configurations are programmable and can be changed multiple times as needed, especially in the beyond 100 GHz applications. The increase in configuration work load leads to a big error probability of configuration; however, in existing networks, there is no effective method to judge or monitor whether the configuration information is erroneous or whether an error occurs during the transmission or transfer process and the location of the error.

Meanwhile, in the wavelength division multiplex system, each optical channel or optical wavelength is loaded with a pilot tone signal, which can be used for realizing multiple special applications. Certain study has been made for the application of the pilot tone signal in the industry. The pilot tone signal sometimes is also called a low-frequency dither signal, and the impact of the pilot tone single loaded in the wavelength signal on the transmission performance of the channel almost can be neglected. In related art, the study made on the pilot tone signal mainly includes: 1) in an optical network element based transport network layer, the pilot tone signal is used to realize the confirmation and power management of a wavelength channel required by fault management in the wavelength division multiplex system; 2) for example, a method for monitoring the performance of an optical amplifier is provided in the method and device for monitoring the performance of an optical transmission system, that is, a pilot tone signal with a known modulation depth is monitored to realize the pre-estimation of signal and noise component of the optical amplifier; 3) in the signal tracking and performance monitoring of a multi-wavelength optical network, a scheme of realizing an on-line wavelength route tracking in a wavelength division multiplex network is proposed, that is to say, each wavelength is modulated by one unique pilot tone signal and digital information is encoded by frequency-shift keying; the pilot tone signal can be monitored at any site in the optical network and thus the wavelength route information of the entire network can be acquired. However, the above applications generally are designed for the fixed-grid ROADM system and are not applicable to the monitoring of flexible-grid and subcarrier. In view of the above problems, no solution has been put forward so far.

SUMMARY

The embodiments of the present disclosure provide methods, apparatuses and a system for monitoring an ROADM optical network, to at least solve the technical problem in related art that the ROADM optical network cannot be effectively monitored.

According to one aspect of the embodiments of the present disclosure, a method for monitoring an ROADM optical network is provided, including: acquiring, from an optical signal, a wavelength label frequency and/or attribute information of a channel used for transmitting the optical signal; and monitoring the ROADM optical network according to the wavelength label frequency and/or the attribute information.

In an example embodiment, the attribute information includes at least one of the following: width of the channel, location of the channel, whether the channel has subcarriers, distribution of the subcarriers, source address, destination address, modulation format, subcarrier multiplexing mode and signal rate.

In an example embodiment, before acquiring the wavelength label frequency and/or the attribute information, the method further includes: transmitting the attribute information on a wavelength label channel.

In an example embodiment, monitoring the ROADM optical network according to the wavelength label frequency and/or the attribute information includes at least one of the following: judging whether there is an optical signal misconnection on a path of the ROADM optical network according to the wavelength label frequency and/or the attribute information; detecting, at where the optical signal is dropped, whether a coherent receiver matches an optical channel of the dropped optical signal according to the wavelength label frequency and/or the attribute information; generating an optical network configuration requirement according to the wavelength label frequency and/or the attribute information, and comparing the optical network configuration requirement with configuration information sent by a network management system to judge whether network management information received by a current node is abnormal.

In an example embodiment, detecting, at where the optical signal is dropped, whether the coherent receiver matches the optical channel of the dropped optical signal according to the wavelength label frequency and/or the attribute information includes: detecting the wavelength label frequency of the optical signal to obtain, by analysis, at least one of the following: distribution of subcarriers and wavelengths, modulation format, subcarrier multiplexing mode and signal rate carried in the wavelength label frequency; comparing the attribute information and the distribution of the subcarriers and/or the wavelengths obtained by analysis with a spectrum emitted by a laser at a monitoring end, to judge whether a local oscillation frequency of a coherent receiver at the monitoring end matches a spectrum of the dropped optical signal; when it is judged that the local oscillation frequency of the coherent receiver at the monitoring end does not match the spectrum of the dropped optical signal, determining that a subcarrier scheduling error occurs during transmission of the optical signal or the optical signal emitted by the laser is erroneous; and/or comparing the attribute information and at least one of the modulation format of the optical channel, the subcarrier multiplexing mode and the signal rate obtained by analysis with at least one of a corresponding demodulation format, subcarrier multiplexing mode and signal rate contained in configuration information received by the monitoring end from the network management system, to judge whether configuration of a sending end matches configuration of a receiving end; when it is judged that the configuration of the sending end does not match the configuration of the receiving end, determining that there is an error in transmission of network management information or the configuration information sent by the network management system is erroneous.

In an example embodiment, judging whether there is an optical signal misconnection on the path of the ROADM optical network according to the wavelength label frequency and/or the attribute information includes: detecting the wavelength label frequency of the optical signal to obtain, by analysis, distribution of subcarriers and/or wavelengths carried in the wavelength label frequency; comparing the distribution of the subcarriers and/or the wavelengths obtained by analysis with the attribute information, to judge whether there is an optical signal misconnection.

In an example embodiment, judging whether there is an error in transmission of network management configuration information on the path of the ROADM optical network according to the wavelength label frequency and/or the attribute information includes: detecting the wavelength label frequency of the optical signal to obtain, by analysis, at least one of the following: the distribution of subcarriers and wavelengths, modulation format of optical channel, subcarrier multiplexing mode and signal rate carried in the wavelength label frequency; generating a configuration requirement of a current node according to the attribute information obtained by analysis, and comparing the configuration requirement with configuration information sent from the network management system to judge whether there is an error in the transmission of the network management configuration information; and/or judging whether a Digital Signal Processor (DSP) algorithm for drop reception is correct according to the attribute information.

In an example embodiment, comparing the distribution of subcarriers and/or wavelengths obtained by analysis with the attribute information to judge whether there is an optical signal misconnection includes at least one of the following: in a condition that the attribute information indicates that the optical signal carries N subcarriers on a first channel but the analyzed number of subcarriers on the first channel carried in the optical signal is less than N, determining that part of subcarriers on the first channel are lost, where N is a positive integer; when the optical signal is dropped, judging, according to the wavelength label frequency and/or the attribute information, whether a site where the optical signal is dropped is the same as a destination site indicated by the attribute information; when it is judged that the site where the optical signal is dropped is not the same as the destination site indicated by the attribute information, determining that an error occurs in fibre connection or spectrum scheduling; in a node in which the optical signal is transmitted, judging whether the configuration requirement of the node generated according to at least one of the distribution of subcarriers and wavelengths, modulation format of optical channel, subcarrier multiplexing mode and signal rate in the attribute information is the same as the configuration information sent by the network management system; when the configuration requirement of the node is not the same as the configuration information sent by the network management system, determining that the configuration information received by the node from the network management system is erroneous.

In an example embodiment, monitoring the ROADM optical network according to the wavelength label frequency includes: in a condition that the wavelength label frequency has a conflict, determining that spectrum of a same frequency has been scheduled into a same fibre.

In an example embodiment, before acquiring the wavelength label frequency carried in the optical signal, the method further includes: loading the wavelength label frequency to one or more subcarriers on the same channel in the optical signal, wherein each subcarrier on the same channel is loaded with the same wavelength label frequency, or, different subcarriers on the same channel are loaded with different wavelength label frequencies.

In an example embodiment, the method further includes: after loading the wavelength label frequency to multiple subcarriers on the same channel in the optical signal, combining the multiple subcarriers, wherein different subcarriers on the same channel are loaded with different wavelength label frequencies; or, before loading the wavelength label frequency to multiple subcarriers on the same channel in the optical signal, combining the multiple subcarriers.

In an example embodiment, the ROADM optical network is a flexible ROADM optical network.

According to a second aspect of the embodiments of the present disclosure, a method for monitoring an ROADM optical network is provided, including: loading, in an optical signal, a wavelength label frequency and attribute information of a channel used for transmitting the optical signal; sending the wavelength label frequency and/or the attribute information, wherein the wavelength label frequency and/or the attribute information is used for monitoring the ROADM optical network.

In an example embodiment, the attribute information includes at least one of the following: width of the channel, location of the channel, whether the channel has subcarriers, distribution of the subcarriers, source address, destination address, modulation format, subcarrier multiplexing mode and signal rate.

In an example embodiment, sending the wavelength label frequency and/or the attribute information includes: sending the wavelength label frequency and/or the attribute information through a wavelength label channel.

According to a third aspect of the embodiments of the present disclosure, an apparatus for monitoring an ROADM optical network is provided, including: an acquisition unit, which is configured to acquire, from an optical signal, a wavelength label frequency and/or attribute information of a channel used for transmitting the optical signal; and a monitoring unit, which is configured to monitor the ROADM optical network according to the wavelength label frequency and/or the attribute information.

In an example embodiment, the attribute information includes at least one of the following: width of the channel, location of the channel, whether the channel has subcarriers, distribution of the subcarriers, source address, destination address, modulation format, subcarrier multiplexing mode and signal rate.

In an example embodiment, the apparatus further includes: a transmitting unit, which is configured to transmit the attribute information on a wavelength label channel, before the acquisition unit acquires, from the optical signal, the wavelength label frequency and/or the attribute information of the channel used for transmitting the optical signal.

In an example embodiment, the monitoring unit includes at least one of the following: a first monitoring component, which is configured to judge whether there is an optical signal misconnection on a path of the ROADM optical network according to the wavelength label frequency and/or the attribute information; a second monitoring component, which is configured to detect, at where the optical signal is dropped, whether a coherent receiver matches an optical channel of the dropped optical signal according to the wavelength label frequency and/or the attribute information, and/or to detect whether a modulation format of a sending end matches a demodulation mode in received network management configuration information; a third monitoring component, which is configured to generate an optical network configuration requirement according to the wavelength label frequency and/or the attribute information, and compare the optical network configuration requirement with configuration information sent by a network management system to judge whether network management information received by a current node is abnormal.

According to a fourth aspect of the embodiments of the present disclosure, an apparatus for monitoring an ROADM optical network is provided, including: a loading unit, which is configured to load, in an optical signal, a wavelength label frequency and attribute information of a channel used for transmitting the optical signal; a sending unit, which is configured to send the wavelength label frequency and/or the attribute information, wherein the wavelength label frequency and/or the attribute information is used for monitoring the ROADM optical network.

In an example embodiment, the attribute information includes at least one of the following: width of the channel, location of the channel, whether the channel has subcarriers, distribution of the subcarriers, source address, destination address, modulation format, subcarrier multiplexing mode and signal rate.

In an example embodiment, the sending unit is configured to send the wavelength label frequency and/or the attribute information through a wavelength label channel.

According to a fifth aspect of the embodiments of the present disclosure, a system for monitoring an ROADM optical network is provided, including the above two apparatuses for monitoring the ROADM optical network.

The embodiments of the present disclosure realize the identification of an optical channel using the wavelength label frequency information and the attribute information of the channel, thereby realizing the monitoring of the ROADM optical network. The solution solves the technical problem in related art that the ROADM optical network cannot be effectively monitored, and achieves the effective monitoring of the ROADM optical network.

BRIEF DESCRIPTION OF THE DRAWINGS

For a better understanding of the present disclosure, accompanying drawings described hereinafter are provided to constitute one part of the application; the schematic embodiments of the present disclosure and the description thereof are used to illustrate the present disclosure but to limit the present disclosure improperly. In the accompanying drawings.

DETAILED DESCRIPTION OF THE EMBODIMENTS

The present disclosure is described below in detail by reference to the accompanying drawings in conjunction with embodiments. It should be noted that the embodiments in the application and the characteristics of the embodiments can be combined if no conflict is caused.

Figures 1, 2:
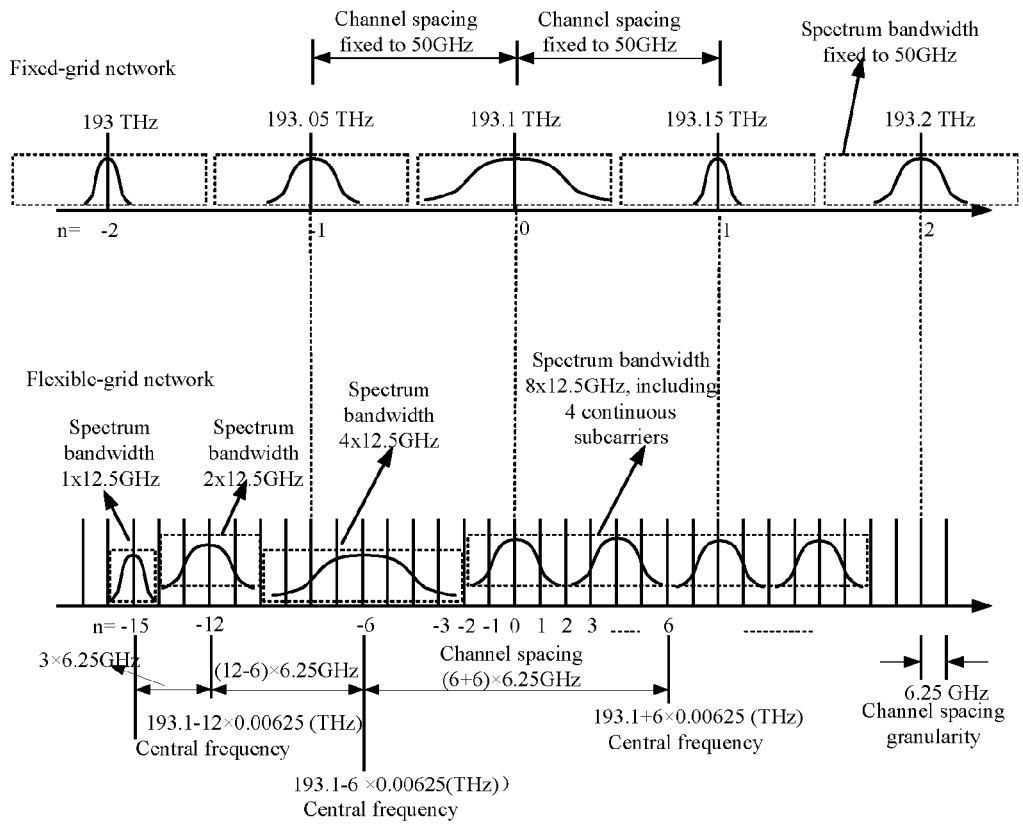
FIG. 1 shows a spectrum diagram of a 50 GHz fixed-grid network and a 50 GHz flexible-grid network.
FIG. 2 shows an example flowchart of a method for monitoring an ROADM optical network according to an embodiment of the present disclosure.

An embodiment of the present disclosure provides an example method for monitoring an ROADM optical network; from the view of the monitoring end, the method includes the following steps as shown in FIG. 2:

S202: a wavelength label frequency and/or attribute information of a channel used for transmitting the optical signal are acquired from an optical signal;

S204: the ROADM optical network is monitored according to the wavelength label frequency and/or the attribute information.

The example embodiment above realizes the identification of an optical channel using the wavelength label frequency information and the attribute information of the channel, thereby realizing the monitoring of the ROADM optical network. The method above solves the technical problem in related art that the ROADM optical network cannot be effectively monitored, and achieves the effective monitoring of the ROADM optical network.

Wavelength label technology is to modulate and encode, at the source end of a wavelength path, a wavelength signal using an encoder before the wavelength signal enters a wavelength division network, so as to add a global unique identification, that is, wavelength label to each wavelength signal. Different wavelength label frequencies represent different wavelengths, because different wavelengths correspond to different frequencies. On each reference point of each node through which a wavelength path passes, the wavelength label frequency of each wavelength passing through this reference point can be monitored and identified by an embedded wavelength label frequency detector. When a wavelength label frequency is transmitted through a wavelength label channel, the wavelength label frequency is loaded in the current time window when a bit or baud is transmitted as 1, and the wavelength label frequency is not loaded in the current time window when a bit or baud is transmitted as 0. In an example embodiment, when the wavelength label frequency is loaded at the source end, frame check information may be added by an encoding method; and at the receiving end, the wavelength label information sent by the source end can be detected according to the amplitude change of each wavelength label frequency in the time window.

In an example embodiment, the attribute information includes but not limited to at least one of the following: width of the channel, location of the channel, whether the channel has subcarriers, distribution of the subcarriers, source address, destination address, modulation format, subcarrier multiplexing mode and signal rate.

In order to enable the attribute information to be easily resolved or enable the attribute information and the wavelength label frequency to be acquired simultaneously, in an example embodiment, the attribute information is transmitted through a wavelength label channel. The identification of attributes of optical channel and subcarriers using the wavelength label frequency, together with the transmitting and receiving of wavelength channel information, realizes the diagnosis and monitoring of an optical signal misconnection in an optical network.

The monitoring of an optical network conducted by the above method mainly includes two aspects: 1) monitoring on each scheduling path; 2) match monitoring of a coherent receiver when an optical signal is dropped. Specifically, the two aspects of monitoring might include:

Monitoring 1): judging whether there is an optical signal misconnection on a path of the ROADM optical network according to the wavelength label frequency and/or the attribute information; and/or judging whether the configuration information sent by the network management system is erroneous; and/or Monitoring 2): detecting, at where the optical signal is dropped, whether a coherent receiver matches an optical channel of the dropped optical signal according to the wavelength label frequency and/or the attribute information; and/or detecting whether at least one of the modulation format, subcarrier multiplexing mode and signal rate sent by the sending end matches the modulation mode in the received network management configuration information.

In addition, the attribute information also may be compared with the configuration information sent by the network management system, to determine whether the network management information received by the current node is abnormal.

The above monitoring 2) may be implemented by the following example method of: detecting the wavelength label frequency of the optical signal, and obtaining, by analysis, the distribution of subcarriers and wavelengths, subcarrier multiplexing mode and signal rate carried in the wavelength label frequency; comparing the attribute information and the distribution of the subcarriers and/or the wavelengths obtained by analysis with a spectrum emitted by a laser at a monitoring end, to judge whether a local oscillation frequency of a coherent receiver at the monitoring end matches a spectrum of the dropped optical signal; when it is judged that the local oscillation frequency of the coherent receiver at the monitoring end does not match the spectrum of the dropped optical signal, determining that a subcarrier scheduling error occurs during transmission of the optical signal or the optical signal emitted by the laser is erroneous. That is, the distribution of the subcarriers and wavelengths is determined through the wavelength label frequency, then the obtained distribution information of subcarriers and wavelengths and the attribute information obtained from the wavelength label channel are compared with a spectrum emitted by a local laser, to finally judge whether a mismatch with a coherent receiver will occur when the optical signal is dropped, thereby judging whether the problem of subcarrier scheduling error or optical signal transmission error has occurred to realize effective monitoring of the optical network. The modulation mode, subcarrier multiplexing mode and signal rate included in the attribute information are compared with at least one of the demodulation mode, subcarrier multiplexing mode and signal rate included in the received network management configuration information; when it is judged that the modulation mode, subcarrier multiplexing mode and signal rate included in the attribute information does not match at least one of the demodulation mode, subcarrier multiplexing mode and signal rate included in the received network management configuration information, it is determined that the configuration information sent by the network management system is erroneous. It may also be judged whether the DSP algorithm (for example, nyqusit based strong filtering damage recovery algorithm) and the like for the drop reception are matched according to the attribute information, to realize the effective detection of transceiving modulation mode and the effective monitoring of network management information.

The above monitoring 1) may be implemented by at least one of the following example methods: the wavelength label frequency of the optical signal is detected to obtain, by analysis, distribution of subcarriers and/or wavelengths carried in the wavelength label frequency; the distribution of the subcarriers and/or the wavelengths obtained by analysis is compared with the attribute information, to judge whether there is an optical signal misconnection. That is, it may be judged whether an optical signal misconnection occurs by analyzing the wavelength label frequency and directly comparing the analyzed result with the attribute information. And/or, in a node in which the optical signal is transmitted, it is judged whether the configuration requirement of the node generated according to at least one of the distribution of subcarriers and wavelengths, modulation format of optical channel, subcarrier multiplexing mode and signal rate in the attribute information is the same as the configuration information sent by the network management system, wherein the configuration information may include grid width, filter shape configuration and the like; when the configuration requirement of the node is not the same as the configuration information sent by the network management system, it can be determined that the configuration information sent by the network management system is erroneous; and/or it can be judged whether the DSP algorithm (for example, nyqusit based strong filtering damage recovery algorithm) and the like for the drop reception are matched according to the attribute information. The above process might include at least one of the following cases:

1) in a condition that the attribute information indicates that the optical signal carries N subcarriers on a first channel but the analyzed number of subcarriers on the first channel carried in the optical signal is less than N, it can be determined that part of subcarriers on the first channel are lost, where N is a positive integer;

2) when the optical signal is dropped, it is judged, according to the wavelength label frequency and/or the attribute information, whether a site where the optical signal is dropped is the same as a destination site indicated by the attribute information; when it is judged that the site where the optical signal is dropped is not the same as the destination site indicated by the attribute information, it can be determined that an error occurs in fibre connection or spectrum scheduling;

3) in a node in which the optical signal is transmitted, it is judged whether the configuration requirement of the node generated according to at least one of the distribution of subcarriers and wavelengths, modulation format of optical channel, subcarrier multiplexing mode and signal rate in the attribute information is the same as the configuration information sent by the network management system, wherein the configuration information may include grid width, filter shape configuration and the like; when the configuration requirement of the node is not the same as the configuration information sent by the network management system, it can be determined that the configuration information sent by the network management system is erroneous.

In an example embodiment, the occurrence of misconnection or conflict may be judged according to the wavelength label frequency only, for example, in a condition that the wavelength label frequency has a conflict, it can be determined that spectrum of a same frequency has been scheduled into a same fibre.

Before S202, the method may further include: loading the wavelength label frequency to one or more subcarriers on the same channel in the optical signal. In an example embodiment, each subcarrier on the same channel may be loaded with the same wavelength label frequency, or, different subcarriers on the same channel may be loaded with different wavelength label frequencies.

In an example embodiment, the above method may further include: combining the multiple subcarriers, wherein the combining process may be performed before loading the wavelength label frequency or after loading the wavelength label frequency. In an example embodiment, if the combining process is performed after loading the wavelength label frequency, different subcarriers on the same channel are loaded with different wavelength label frequencies.

Figure 3:
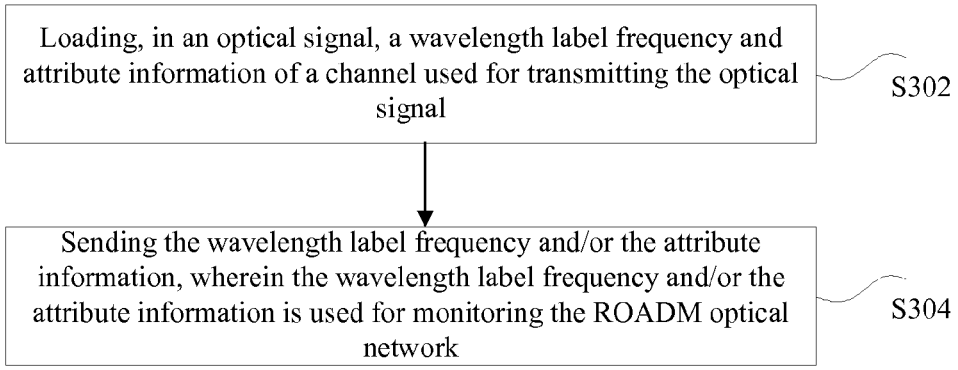
FIG. 3 shows another example flowchart of a method for monitoring an ROADM optical network according to an embodiment of the present disclosure.

Another embodiment of the present disclosure provides an example method for monitoring an ROADM optical network; from the view of sending end, the method includes the following steps as shown in FIG. 3:

S302: a wavelength label frequency and attribute information of a channel used for transmitting an optical signal are loaded in the optical signal.

S304: the wavelength label frequency and/or the attribute information are sent, wherein the wavelength label frequency and/or the attribute information is used for monitoring the ROADM optical network.

In an example embodiment, S302 and S304 may be conducted before S202. S302 and S304 are conducted at the loading end while S202 and S204 are conducted at the receiving end or monitoring end.

The attribute information includes but not limited to at least one of the following: width of the channel, location of the channel, whether the channel has subcarriers, distribution of the subcarriers, source address, destination address, modulation format, subcarrier multiplexing mode and signal rate. In an example embodiment, the attribute information may be sent through a wavelength label channel.

In each of the example embodiments above, the ROADM optical network may be a Flex ROADM optical network.

Another embodiment provides an apparatus for monitoring an ROADM optical network, which is configured to implement the above embodiments and example embodiments. For those described above, no further description is needed here. Term "Unit" or "component" referred hereinafter can realize the combination of software and/or hardware having preset functions. Although the apparatus described in the following embodiments preferably is realized in the form of software, it is also possible to realize the apparatus in the form of hardware or the combination of software and hardware.

Figure 4:
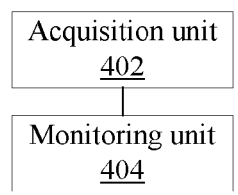
FIG. 4 shows an example structure diagram of an apparatus for monitoring an ROADM optical network according to an embodiment of the present disclosure.

FIG. 4 shows an example structure diagram of an apparatus for monitoring an ROADM optical network according to an embodiment of the present disclosure. In the example embodiment, this apparatus is located at a receiving end (or monitoring end), which as shown in FIG. 4 includes: an acquisition unit 402 and a monitoring unit 404; the structure thereof is described below.

The acquisition unit 402 is configured to acquire, from an optical signal, a wavelength label frequency and/or attribute information of a channel used for transmitting the optical signal.

The monitoring unit 404 is coupled with the acquisition unit 402 and is configured to monitor the ROADM optical network according to the wavelength label frequency and/or the attribute information.

Figure 5:
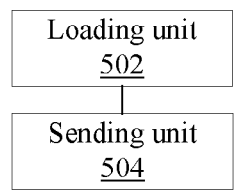
FIG. 5 shows another example structure diagram of an apparatus for monitoring an ROADM optical network according to an embodiment of the present disclosure.

Another embodiment of the present disclosure provides an example apparatus for monitoring an ROADM optical network. This apparatus is located at a loading end (or sending end), which as shown in FIG. 5 includes: a loading unit 502, which is configured to load, in an optical signal, a wavelength label frequency and attribute information of a channel used for transmitting the optical signal; a sending unit 504, which is coupled with the loading unit 502 and is configured to send the wavelength label frequency and/or the attribute information, wherein the wavelength label frequency or the attribute information is used for monitoring the ROADM optical network.

In an example embodiment, the sending unit 504 is further configured to send the wavelength label frequency and/or the attribute information through a wavelength label channel.

In an example embodiment, the monitoring unit includes: a first monitoring component, which is configured to judge whether there is an optical signal misconnection on a path of the ROADM optical network according to the wavelength label frequency and/or the attribute information, and/or to determine whether the configuration information sent by the network management system is erroneous; and/or a second monitoring component, which is configured to detect, at where the optical signal is dropped, whether a coherent receiver matches an optical channel of the dropped optical signal according to the wavelength label frequency and/or the attribute information, and/or to detect whether at least one of the modulation format, subcarrier multiplexing mode and signal rate of the sending end matches the demodulation mode in the received network configuration information.

The second monitoring component is further configured to process at least one of the following: detecting the wavelength label frequency of the optical signal to obtain, by analysis, distribution of subcarriers and/or wavelengths carried in the wavelength label frequency, comparing the attribute information and the distribution of the subcarriers and/or the wavelengths obtained by analysis with a spectrum emitted by a laser at a monitoring end, to judge whether a local oscillation frequency of a coherent receiver at the monitoring end matches a spectrum of the dropped optical signal, when it is judged that the local oscillation frequency of the coherent receiver at the monitoring end does not match the spectrum of the dropped optical signal, determining that a subcarrier scheduling error occurs during transmission of the optical signal or the optical signal emitted by the laser is erroneous; comparing at least one of the modulation mode, subcarrier multiplexing mode and signal node included in the attribute information with the demodulation mode in the received network management configuration information, when it is judged that at least one of the modulation mode, subcarrier multiplexing mode and signal node included in the attribute information does not match the demodulation mode in the received network management configuration information, determining that the configuration information sent by the network management system is erroneous; and judging whether the DSP algorithm (for example, nyqusit based strong filtering damage recovery algorithm) and the like for the drop reception are matched according to the attribute information, to realize the effective detection of transceiving modulation mode and the effective monitoring of network management information.

The first monitoring component is further configured to: detect the wavelength label frequency of the optical signal, obtain, by analysis, the distribution of wavelengths and/or subcarriers carried in the wavelength label frequency and compare the distribution of wavelengths and/or subcarriers obtained by analysis with the attribute information, so as to determine whether there is an optical signal misconnection; and/or, in a node in which the optical signal is transmitted, determine whether the configuration requirement of the node generated according to at least one of the distribution of subcarriers and wavelengths, modulation format of optical channel, subcarrier multiplexing mode and signal rate in the attribute information is the same as the configuration information sent by the network management system; when the configuration requirement of the node is not the same as the configuration information sent by the network management system, determine that the configuration information sent by the network management system is erroneous.

A third monitoring component, which is configured to: generate an optical network configuration requirement according to the wavelength label frequency and/or the attribute information, compare the optical network configuration requirement with configuration information sent by a network management system to judge whether network management information received by a current node is abnormal.

In an example embodiment, when the first monitoring component performs the monitoring of optical signal misconnection, at least one of the following cases may be included:

1) in a condition that the attribute information indicates that the optical signal carries N subcarriers on a first channel but the analyzed number of subcarriers on the first channel carried in the optical signal is less than N, determining that part of subcarriers on the first channel are lost, where N is a positive integer;

2) when the optical signal is dropped, judging, according to the wavelength label frequency and/or the attribute information, whether a site where the optical signal is dropped is the same as a destination site indicated by the attribute information; when it is judged that the site where the optical signal is dropped is not the same as the destination site indicated by the attribute information, determining that an error occurs in fibre connection or spectrum scheduling;

3) in a node in which the optical signal is transmitted, judging whether the configuration requirement of the node generated according to at least one of the distribution of subcarriers and wavelengths, modulation format of optical channel, subcarrier multiplexing mode and signal rate in the attribute information is the same as the configuration information sent by the network management system, wherein the configuration information may include grid width, filter shape configuration and the like; when the configuration requirement of the node is not the same as the configuration information sent by the network management system, determining that the configuration information sent by the network management system is erroneous; and/or judging whether the DSP algorithm (for example, nyqusit based strong filtering damage recovery algorithm) and the like for the drop reception are matched according to the attribute information; if not, determining that the reception algorithm of the drop node is erroneous.

In an example embodiment, the above monitoring unit is further configured to determine, in a condition that the wavelength label frequency has a conflict, that spectrum of a same frequency has been scheduled into a same fibre.

In an example embodiment, the loading unit 502 is further configured to load the wavelength label frequency to one or more subcarriers on the same channel in the optical signal, wherein each subcarrier on the same channel is loaded with the same wavelength label frequency, or, different subcarriers on the same channel are loaded with different wavelength label frequencies.

In an example embodiment, the above apparatus may further include: a combining unit, which is configured to combine the multiple subcarriers, wherein the combining unit may perform combination before the loading unit loads the wavelength label frequency or after the load unit loads the wavelength label frequency.

Another embodiment of the present disclosure provides an example system for monitoring an ROADM optical network, which includes the apparatus located at the loading end (or sending end) for monitoring the ROADM optical network and the apparatus located at the receiving end (or monitoring end) for monitoring the ROADM optical network.

For the diagnosis of optical signal misconnection in a fixed-grid ROADM system, the monitoring mode is to add a wavelength label frequency to a channel, determine whether an optical channel exists and the transmission path of the optical channel by detecting on a line whether the wavelength label frequency exists. By adding different low-frequency wavelength label frequencies to different wavelengths, the low-frequency wavelength label frequencies can be analyzed on an optical signal multiplexing section according to a spectrum, thus corresponding wavelengths can be obtained. In addition, an effective detection of wavelength conflict also can be realized through the wavelength label frequency. However, in a fixed-grid system, the condition that an optical signal of one channel is divided into different interfaces on a spectrum and the problem of one or more subcarriers do not exist, and the problem that subcarriers are scattered on the spectrum and entire monitoring is needed does not exist either.

In order to adapt to a flexible-grid system and to monitor subcarriers in a flexible-grid system, not only a corresponding wavelength label frequency is to be added to a channel, but the related attribute information (for example, width of the channel, location of the channel, whether the channel has subcarriers, distribution of the subcarriers, source address, destination address, modulation format, subcarrier multiplexing mode and signal rate) of the optical channel or subcarriers is to be transmitted through a wavelength label channel too. In this way, it can be determined on a line whether an optical signal misconnection (so called optical signal misconnection might include the error in fibre connection and spectrum scheduling and the like) occurs by monitoring whether the optical channel or subcarriers is complete, or it can be determined whether the configuration information (for example, how to shape an optical channel) sent by the network management system matches the configuration requirement generated according to the wavelengths or subcarriers and modulation format; or, it can be detected in the drop fibre whether a similar error occurs and whether the local oscillation frequency of a coherent receiver is matched, or it can be detected whether the modulation format of the sending end matches the demodulation mode in the network management configuration information received by the drop node (for example, the source end adopts 16QAM to modulate, but the configuration information sent by the network management system requires a demodulation based on QPSK).

In order to overcome the defects of the fixed-grid ROADM, based on the characteristic that the optical channel of the Flex ROADM has a flexible spectrum width and has subcarriers, which probably are discontinuous, a wavelength label is loaded for the optical channel or optical subcarriers by the above method of adding a wavelength label frequency, and the attribute information of the optical channel or optical subcarriers is transmitted through the wavelength label channel, thus it can be monitored on an optical path whether the optical channel or subcarriers is complete, and it can determined whether a signal misconnection occurs, whether the configuration information sent by the network management system is erroneous, and whether the local oscillation spectrum of a coherent receiver does not match the optical channel of the optical signal to be dropped.

The embodiments of the present disclosure provide an example apparatus and an example method for diagnosing an optical signal misconnection in a Flex ROADM system, which are applicable to monitoring the wavelength or subcarriers in a high-speed optical signal.

In a beyond 100G network, all subcarriers may be loaded with the same wavelength label frequency, or different subcarriers may be loaded with different wavelength label frequencies, or different subcarrier sets may be loaded with different wavelength label frequencies. Monitoring is performed on each path scheduled by the optical-layer ROADM, to judge whether the scheduling of subcarriers is correct and whether the configuration information sent by the network management system is erroneous; and at where the optical signal is dropped, it is detected whether the local oscillation frequency of a coherent receiver matches the spectrum of the drop node or the frequency of each subcarrier, whether the modulation format and/or subcarrier multiplexing mode and/or signal rate matches the demodulation mode corresponding to a demodulation end, thereby achieving the diagnosis of optical signal misconnection in the Flex ROADM.

The technical solution provided in the embodiments of the present disclosure is described below in detail in conjunction with some example embodiments.

Figure 6:
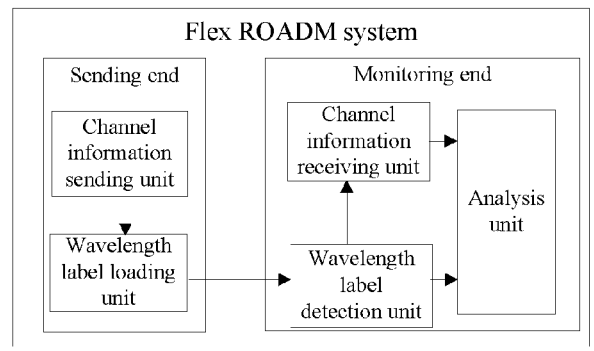
FIG. 6 shows an example diagram of a fibre connection diagnosis system of a Flex ROADM system according to an embodiment of the present disclosure.

A Flex ROADM system as shown in FIG. 6 includes a sending end and one or more monitoring ends. The sending end includes a wavelength label loading unit and an information sending unit; and each monitoring end includes a wavelength label detection unit, an information receiving unit and an analysis unit. The structure thereof is described below in detail.

The information sent by the information sending unit mainly represents the attribute of a channel used for sending an optical signal, for example, width of the channel, location of the channel, whether the channel has subcarriers, distribution of the subcarriers, source node address, destination node address, modulation format, subcarrier multiplexing mode, signal rate and the like. The attribute information may be transmitted by a wavelength label channel realized by a wavelength label loading unit. If one channel (the channel mentioned above) includes multiple subcarriers, when loading the wavelength label frequency to the subcarriers, each subcarrier may be loaded with the same wavelength label frequency or different subcarriers may be loaded with different wavelength label frequencies.

The wavelength label detection unit is configured to determine a wavelength corresponding to an optical signal by analyzing a wavelength label frequency included in the optical signal.

The information receiving unit is configured to receive the attribute information of the optical channel transmitted in the wavelength label channel.

The analysis unit is configured to receive the result detected by the wavelength detection unit and the information received by the information receiving unit, to compare the distribution of wavelengths or subcarriers of an optical signal, and judge whether the scheduling of each subcarrier in the ROADM system is correct, whether the spectrum scheduling is correct in the line, whether the configuration information sent by the network management system is erroneous; or, whether the spectrum of an optical signal emitted by a local oscillation laser is matched, and whether at least one of the modulation format, subcarrier multiplexing mode and signal rate matches the demodulation mode corresponding to the demodulation end.

In the Flex ROADM system, in each optical signal subjected to intermediate spectrum scheduling or dropped, the wavelength label frequency can be detected through light splitting and the attribute information of the optical channel can be analyzed. By comparing the optical wavelength or optical subcarrier corresponding to the wavelength label frequency with the attribute information of the optical channel, it can be determined whether the optical signal has a misconnection problem and whether the configuration information sent by the network management system is erroneous.

Based on the Flex ROADM system including one sending end and one or more monitoring ends, an embodiment also provides a processing method thereof, which includes processing steps as follows.

At the sending end: according to a wavelength or a central frequency of subcarrier, a corresponding wavelength label frequency is selected and loaded to the wavelength or subcarrier; and the attribute information (for example: width of the channel, location of the channel, whether the channel has subcarriers, distribution of the subcarriers, source address, destination address, modulation format, subcarrier multiplexing mode and signal rate) of the wavelength or subcarrier is transmitted through a wavelength label channel.

At the monitoring end: the wavelength label frequency carried in an optical signal is detected, the wavelength or subcarrier therein is analyzed; the channel attribute information is received through the wavelength label channel, the wavelength and subcarrier are compared with the channel attribute information so as to judge whether the optical signal has a misconnection (so called misconnection mainly includes: the error in fibre connection and spectrum scheduling and the like) and whether the configuration information sent by the network management system is erroneous. The judgment method might include following processes:

1) if it is analyzed from the attribute information of a channel that multiple subcarriers of the channel should appear in one optical signal, but only part of subcarriers are detected in this optical signal, then it can be determined that part of subcarriers suffer an error in the fiber connection or spectrum scheduling and thus the part of subcarriers are lost on the optical channel;

2) if it is found from the wavelength label frequency that there is a wavelength label conflict, it can be determined that there is an error in the fiber connection or spectrum scheduling, consequently part spectrums of the same frequency are scheduled into one same fiber and a conflict is caused;

3) if it is found from the wavelength label frequency and the attribute information of a channel that this channel is from a certain site to a certain destination site, however it is found, when dropping the optical signal, that the drop site is not the destination site, then it can be determined that there is an error in the fiber connection or spectrum scheduling and thus a certain channel is lost;

4) from the wavelength label frequency, the attribute information of a channel and the attribute of the found drop wavelength or subcarrier, it can be judged whether the local oscillation frequency of a coherent receiver matches the frequency of a drop spectrum or each subcarrier;

5) it can be judged whether the configuration requirement of the current node generated according to at least one of the distribution of subcarriers and wavelengths, modulation format of optical channel, subcarrier multiplexing mode and signal rate in the attribute information is the same as the configuration information sent by the network management system; if not, it can be determined that the configuration information received from the network management system has an error;

6) the modulation mode included in the attribute information is compared with the demodulation mode included in the received network management configuration information, and/or it can be judged whether the DSP algorithm (for example, nyqusit based strong filtering damage recovery algorithm) and the like for the drop reception are matched according to the attribute information; if not, it can be determined that the configuration information sent by the network management system has an error, so as to realize the effective detection of transceiving modulation mode and the effective monitoring of network management information.

In each example embodiment above, it can be judged whether an optical signal misconnection occurs and whether the network management information is correct by adding a corresponding wavelength label frequency to an optical channel or subcarrier, transmitting the related attribute information of the optical channel or subcarrier through a wavelength label channel, and monitoring on a line whether the optical channel or subcarrier is complete; or, it can be detected in the drop fibre whether a similar error occurs and whether the local oscillation frequency of a coherent receiver is matched, whether the demodulation mode matches the modulation mode and whether the DSP algorithm for the drop reception is matched. Thus, the problem in diagnosing optical signal misconnection and network management information transmission error in the Flex ROADM system is solved in related art, and the effective monitoring of a fixed-grid optical channel and a flexible-grid optical channel is enabled.

The embodiments of the present disclosure mainly are based on a flexible-grid wavelength division multiplex system employing the wavelength label technology. The technical solution realizes the identification of optical channel and optical subcarrier attributes using a wavelength label frequency, which, in combination of the transceiving of the wavelength channel information, can implement the diagnosis and montiroing of optical signal misconnection and network management information transmission error in the Flex ROADM system.

The main principle of the embodiments of the present disclosure is that: the wavelength label loading end loads a wavelength label signal to an optical signal and sends the related attribute information of a channel through a wavelength label channel; at the monitoring end, the wavelength label detection unit detects the wavelength label frequency, thereby determining the wavelength or subcarrier therein, and the information receiving unit receives the related attribute information of each optical channel in the optical signal, so that it can be judged, according to the wavelength or subcarrier and the attribute information of the optical channel, whether the fiber connection and spectrum scheduling is correct in the Flex ROADM; in addition, a comparison can be performed between the above information and the received network management configuration information, so as to judge whether the network management information is correctly transmitted.

The above embodiments of the present disclosure are described below in further detail in conjunction with several specific applications as follows.

FIG. 1 shows a comparison diagram between a fixed-grid network and a flexible-grid network. As shown in FIG. 1, in the fixed-grid network, the spacing between two adjacent channels of wavelengths bearing services of different rates is fixed to 50 GHz; meanwhile, each wavelength is allocated with a fixed spectrum bandwidth resource of 50 GHz. However, in the flexible-grid optical network, high-speed services can be allocated with more spectrum bandwidth resources according to the actual condition, and low-speed services can be allocated with fewer but enough spectrum resources; in this way, the bandwidth utilization of network is greatly improved. In the flexible-grid optical network, the spectrum width of one channel might be 12.5 G, 25 G, 50 G, 75 G, 100 GHz and so on.

FIG. 6 shows a diagram of a fibre connection diagnosis system of a Flex ROADM system, including a sending end and one or more monitoring ends. The sending end includes a wavelength label loading unit and a channel information sending unit, wherein the wavelength label loading unit loads the wavelength label frequency corresponding to an optical channel or subcarrier to this optical channel or subcarrier; the channel information sending unit sends the related attribute of the optical channel or subcarrier through a certain channel; in an example embodiment, this channel might be a wavelength label channel formed by a wavelength label.

Each monitoring end includes a wavelength label detection unit, a channel information receiving unit and an analysis unit, wherein the wavelength label detection unit detects the wavelength label frequency carried in an optical signal and analyzes the frequency carried therein, so as to determine the optical channels or subcarriers existing in the optical signal; the channel information receiving unit receives the attribute information of the optical channel through a wavelength label channel, analyzes the optical channel or subcarrier that should exist; the analysis unit receives the detection result of the wavelength label detection unit and the information received by the channel information receiving unit, analyzes whether the fiber connection and spectrum scheduling in the Flex ROADM is correct and whether the network management configuration information is correct by comparing the wavelength information detected by the wavelength label detection unit with the optical channel attribute information received by the channel information receiving unit.

Figure 7:
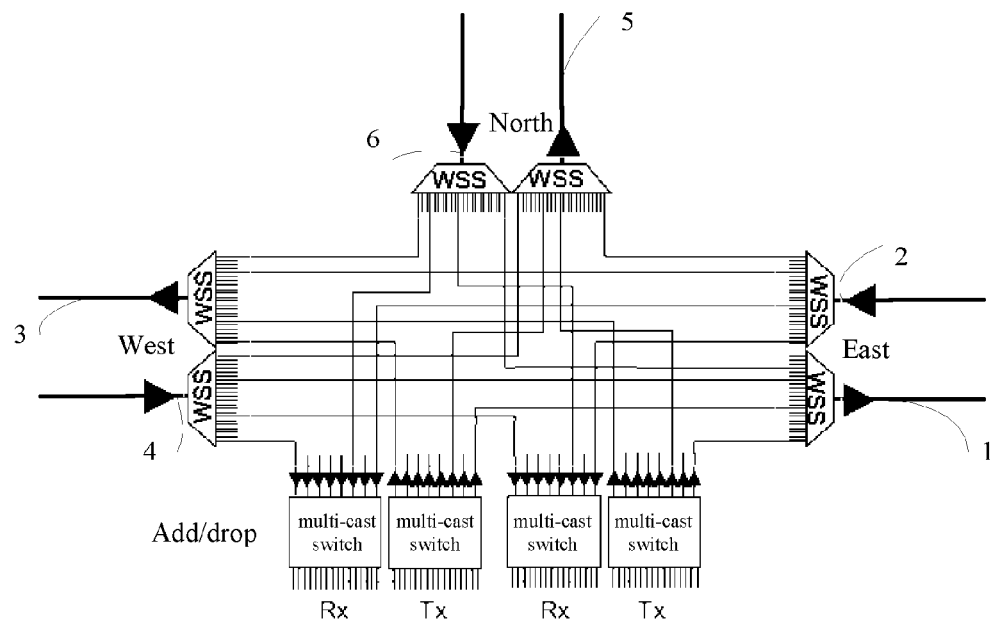
FIG. 7 shows a connection diagram of add/drop optical signals and optical signals of all directions of a certain node in a Flex ROADM system according to an embodiment of the present disclosure.

FIG. 7 is a connection diagram showing the add/drop and scheduling of optical signals of all directions at a certain node in a Flex ROADM system. In FIG. 7, each multiplex section fibre includes an optical splitter, wherein the optical splitter splits part of the optical signal of the multiplex section for wavelength label detection. In FIG. 7, 6 optical signals are split out, which are 1, 2, 3, 4, 5 and 6 respectively.

By analyzing the wavelength label of the 6 optical signals, it can be obtained whether there is a problem in the scheduling of optical channel or spectrum; for example, part spectrum of a certain channel is scheduled to an incorrect fibre.

Figure 8:
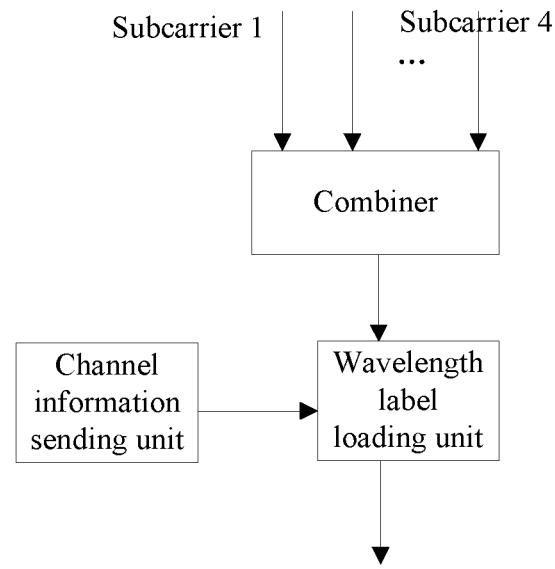
FIG. 8 shows an example diagram of a sending end according to an embodiment of the present disclosure.

FIG. 8 shows an embodiment of a sending end. An uplink channel includes 4 subcarriers; after the 4 subcarriers are combined via a combiner, the wavelength label loading unit adds a wavelength label frequency to the 4 subcarriers simultaneously, meanwhile the wavelength label loading unit adds the optical channel attribute information sent by the channel information sending unit to a wavelength label channel. In this way, a wavelength label signal includes both the wavelength label frequency and the optical channel attribute information. The wavelength label frequency herein may be a wavelength label frequency corresponding to the optical channel, and in such a case, there might be one frequency only; the wavelength label frequency may also be a wavelength label frequency corresponding to each subcarrier, and in such a case, there may be one frequency or more frequencies.

Figure 9:
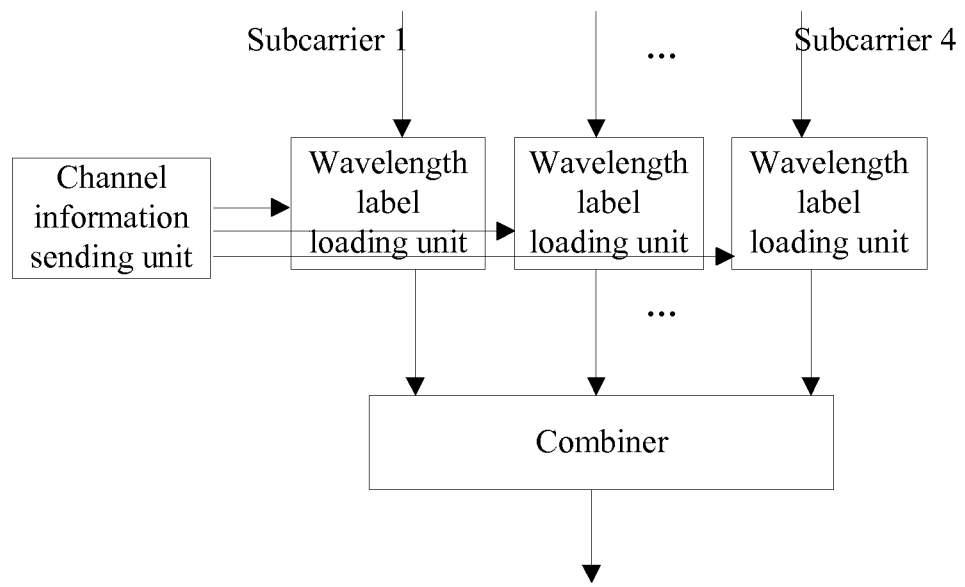
FIG. 9 shows another example diagram of a sending end according to an embodiment of the present disclosure.

FIG. 9 shows another embodiment of a sending end. In FIG. 9, an uplink channel includes 4 subcarriers; the wavelength label loading unit adds a wavelength label frequency to each of the 4 subcarriers respectively, meanwhile the wavelength label loading unit adds the optical channel attribute information sent by the channel information sending unit to a wavelength label channel. Then, the 4 subcarriers are combined via a combiner. Each wavelength label signal includes at least one wavelength label frequency, the attribute information of the optical channel and subcarrier is transmitted through a wavelength label channel formed by the wavelength label. Since each subcarrier has a different wavelength label frequency, the scheduling of subcarriers can be monitored through their respective wavelength label frequencies in the optical line.

Figure 10:
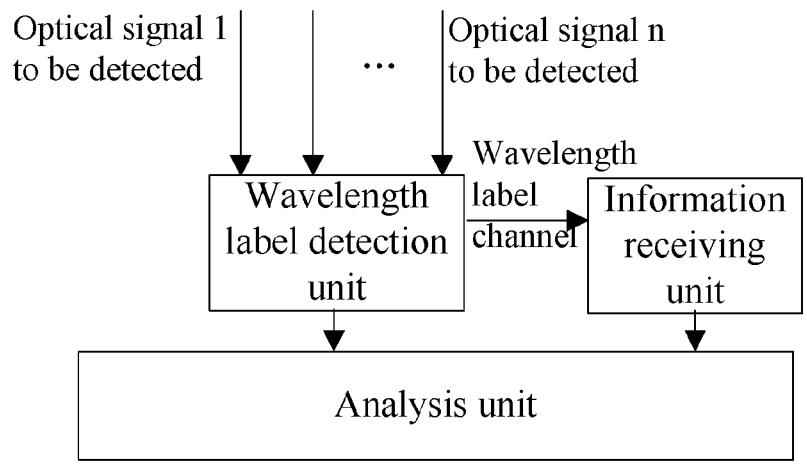
FIG. 10 shows an example diagram of a monitoring end according to an embodiment of the present disclosure.

FIG. 10 shows an embodiment of a monitoring end. In FIG. 10, there are n optical signals to be detected; each optical signal probably contains multiple optical channels. The wavelength label detection unit performs wavelength label detection on the n optical signals, and detects the wavelength label frequency carried in each optical signal; the information receiving unit receives the optical channel attribute information transmitted through a wavelength label channel formed by the wavelength label. The analysis unit receives the detection result of the wavelength label detection unit and the information received by the information receiving unit, compares the distribution of wavelengths or subcarriers in the n optical signals, and determines whether the scheduling of each subcarrier in the ROADM system is correct, whether the spectrum scheduling in the line is correct and whether the network management configuration information is correct.

Figure 11:
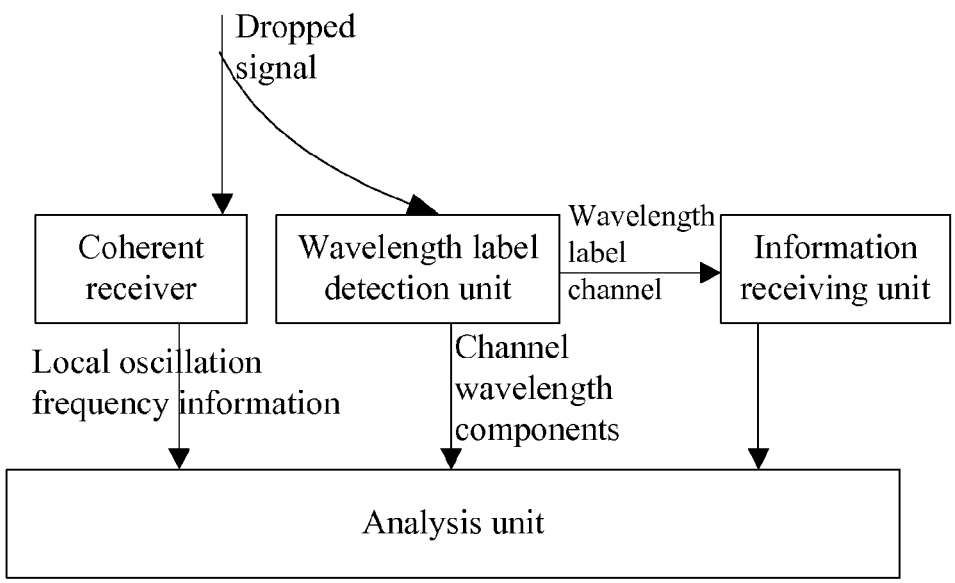
FIG. 11 shows another example diagram of a monitoring end according to an embodiment of the present disclosure.

FIG. 11 shows another embodiment of the monitoring end. In FIG. 11, the wavelength label detection unit detects the wavelength label frequency of a dropped optical signal, and determines the distribution of optical wavelength or subcarrier carried therein. The information receiving unit receives the optical channel attribute information transmitted through a wavelength label channel formed by the wavelength label. The analysis unit receives the detection result of the wavelength label detection unit and the information received by the information receiving unit and compares them with the spectrum emitted by a local laser, so as to determine whether the local oscillation frequency of a coherent receiver matches the spectrum where the signal is dropped, thereby monitoring whether there is an error in the scheduling of subcarriers or whether there is an error in the optical signal emitted by a local laser; and to determine whether the modulation mode of the sending end matches the local demodulation mode and whether the DSP algorithm (for example, nyqusit based strong filtering damage recovery algorithm) and the like for the drop reception are matched according to the attribute information, thereby monitoring whether the network management configuration information is correct. In an example embodiment, the coherent receiver might be a receiving unit for high-speed services.

The above apparatuses and methods realize the diagnosis of optical signal misconnection and the monitoring of network management information transmission error in an ROADM system, that is, the monitoring on whether the scheduling of optical channel or subcarrier is correct, the monitoring on whether the dropped optical signal matches the optical signal emitted by a local laser of a coherent receiver and the monitoring on whether there is an error in the transmission of network management information, thereby realizing the effective monitoring of the ROADM network.

In another embodiment, software is provided, which is configured to execute the technical scheme described in the above embodiments and example embodiments.

In another embodiment, a storage medium is provided, in which the above software is stored; the storage medium includes but not limited to: compact disc, floppy disk, hard disk, erasable storage and the like.

From the above description it can be seen that the technical solution of the embodiments of the present disclosure achieves following technical effects: an optical channel can be identified using the wavelength label frequency information and the attribute information of a channel, thereby realizing the monitoring of an ROADM optical network. The above methods solve the technical problem in related art that the ROADM optical network cannot be effectively monitored, and achieve the effective monitoring of the ROADM optical network.

Obviously, those skilled in the art should understand that the components or steps described above can be implemented by a common computer device; the components or steps can be integrated on a single computing device or distributed on a network composed of a plurality of computing devices; optionally, the components or steps can be implemented by a programming code executable by a computing device, thus they can be stored in a storage device to be executed by a computing device and executed in a different order in some cases, or manufactured into individual integrated circuit component respectively, or several of them can be manufactured into a single integrated circuit component to implement; in this way, the present disclosure is not limited to any combination of specific hardware and software.

The above are only the example embodiments of the present disclosure and not intended to limit the present disclosure. For those skilled in the art, various modifications and changes can be made to the present disclosure. Any modification, equivalent substitute and improvement made within the principle of the present disclosure are deemed to be included within the scope of protection defined by the claims of the present disclosure.

To sum up, the methods, apparatuses and system provided by the embodiments of the present disclosure for monitoring an ROADM optical network achieve effects of: solving the technical problem in related art that the ROADM optical network cannot be effectively monitored and achieving the effective monitoring of the ROADM optical network.

What is claimed is:

1. A method for monitoring a Reconfigurable Optical Add Drop Multiplexer (ROADM) optical network, comprising:
    acquiring from an optical signal, a wavelength label frequency, or the wavelength label frequency and attribute information of a channel used for transmitting the optical signal; and
    monitoring the ROADM optical network according to the wavelength label frequency or according to the wavelength label frequency and the attribute information;
    wherein monitoring the ROADM optical network according to the wavelength label frequency and/or the attribute information comprises at least one of the following: judging whether there is an optical signal misconnection on a path of the ROADM optical network according to the wavelength label frequency and/or the attribute information;detecting, at where the optical signal is dropped, whether a coherent receiver matches an optical channel of the dropped optical signal according to the wavelength label frequency and/or the attribute information; generating an optical network configuration requirement according to the wavelength label frequency and/or the attribute information, and comparing the optical network configuration requirement with configuration information sent by a network management system to judge whether network management information received by a current node is abnormal.

2. The method as claimed in claim 1, wherein the attribute information comprises at least one of the following: width of the channel, location of the channel, whether the channel has subcarriers, distribution of the subcarriers, source address, destination address, modulation format, subcarrier multiplexing mode and signal rate.

3. The method as claimed in claim 1, wherein before acquiring the wavelength label frequency and/or the attribute information, the method further comprises:
    transmitting the attribute information on a wavelength label channel.

4. The method as claimed in claim 1, wherein detecting, at where the optical signal is dropped, whether the coherent receiver matches the optical channel of the dropped optical signal according to the wavelength label frequency and/or the attribute information comprises:
    detecting the wavelength label frequency of the optical signal to obtain, by analysis, at least one of the following: distribution of subcarriers and wavelengths, modulation format, subcarrier multiplexing mode and signal rate carried in the wavelength label frequency;
    comparing the attribute information and the distribution of the subcarriers and/or the wavelengths obtained by analysis with a spectrum emitted by a laser at a monitoring end, to judge whether a local oscillation frequency of a coherent receiver at the monitoring end matches a spectrum of the dropped optical signal, when it is judged that the local oscillation frequency of the coherent receiver at the monitoring end does not match the spectrum of the dropped optical signal, determining that a subcarrier scheduling error occurs during transmission of the optical signal or the optical signal emitted by the laser is erroneous; and/or comparing the attribute information and at least one of the modulation format of the optical channel, the subcarrier multiplexing mode and the signal rate obtained by analysis with at least one of a corresponding demodulation format, subcarrier multiplexing mode and signal rate contained in configuration information received by the monitoring end from the network management system, to judge whether configuration of a sending end matches configuration of a receiving end; when it is judged that the configuration of the sending end does not match the configuration of the receiving end, determining that there is an error in transmission of network management information or the configuration information sent by the network management system is erroneous.

5. The method as claimed in claim 1, wherein judging whether there is an optical signal misconnection on the path of the ROADM optical network according to the wavelength label frequency and/or the attribute information comprises:
    detecting the wavelength label frequency of the optical signal to obtain, by analysis, distribution of subcarriers and/or wavelengths carried in the wavelength label frequency;
    comparing the distribution of the subcarriers and/or the wavelengths obtained by analysis with the attribute information, to judge whether there is an optical signal misconnection.

6. The method as claimed in claim 1, wherein judging whether there is an error in the transmission of the network management configuration information on the path of the ROADM optical network according to the wavelength label frequency and/or the attribute information comprises:
    detecting the wavelength label frequency of the optical signal to obtain, by analysis, at least one of the following: distribution of subcarriers and wavelengths, modulation format of optical channel, subcarrier multiplexing mode and signal rate carried in the wavelength label frequency;
    generating a configuration requirement of a current node according to the attribute information obtained by analysis, and comparing the configuration requirement with configuration information sent from the network management system to judge whether there is an error in the transmission of the network management configuration information; and/or judging whether a Digital Signal Processor (DSP) algorithm for drop reception is correct according to the attribute information.

7. The method as claimed in claim 5, wherein comparing the distribution of subcarriers and/or wavelengths obtained by analysis with the attribute information to judge whether there is an optical signal misconnection comprises at least one of the following:
    in a condition that the attribute information indicates that the optical signal carries N subcarriers on a first channel but the analyzed number of subcarriers on the first channel carried in the optical signal is less than N, determining that part of subcarriers on the first channel are lost, where N is a positive integer;
    when the optical signal is dropped, judging, according to the wavelength label frequency and/or the attribute information, whether a site where the optical signal is dropped is the same as a destination site indicated by the attribute information; when it is judged that the site where the optical signal is dropped is not the same as the destination site indicated by the attribute information, determining that an error occurs in fibre connection or spectrum scheduling;
    in a node in which the optical signal is transmitted, judging whether a configuration requirement of the node generated according to at least one of the distribution of subcarriers and wavelengths, modulation format of optical channel, subcarrier multiplexing mode and signal rate in the attribute information is the same as the configuration information sent by the network management system; when the configuration requirement of the node is not the same as the configuration information sent by the network management system, determining that the configuration information received by the node from the network management system is erroneous.

8. The method as claimed in claim 1, wherein monitoring the ROADM optical network according to the wavelength label frequency comprises: in a condition that the wavelength label frequency has a conflict, determining that spectrum of a same frequency has been scheduled into a same fibre.

9. The method as claimed in claim 1, wherein before acquiring the wavelength label frequency carried in the optical signal, the method further comprises:
    loading the wavelength label frequency to one or more subcarriers on the same channel in the optical signal, wherein each subcarrier on the same channel is loaded with the same wavelength label frequency, or, different subcarriers on the same channel are loaded with different wavelength label frequencies.

10. The method as claimed in claim 9, further comprising:
    after loading the wavelength label frequency to multiple subcarriers on the same channel in the optical signal, combining the multiple subcarriers, wherein different subcarriers on the same channel are loaded with different wavelength label frequencies; or,
    before loading the wavelength label frequency to the multiple subcarriers on the same channel in the optical signal, combining the multiple subcarriers.

11. The method as claimed in any one of claims 1 to 3 and 4 to 10, wherein the ROADM optical network is a flexible ROADM optical network.

12. A method for monitoring a Reconfigurable Optical Add Drop Multiplexer (ROADM) optical network, comprising:
    Loading in an optical signal, a wavelength label frequency and attribute information of a channel used for transmitting the optical signal;
    sending the wavelength label frequency and/or the attribute information, wherein the wavelength label frequency and the attribute information is used for monitoring the ROADM optical network;
    wherein monitoring the ROADM optical network according to the wavelength label frequency and/or the attribute information comprises at least one of the following: judging whether there is an optical signal misconnection on a path of the ROADM optical network according to the wavelength label frequency and/or the attribute information;detecting, at where the optical signal is dropped, whether a coherent receiver matches an optical channel of the dropped optical signal according to the wavelength label frequency and/or the attribute information; generating an optical network configuration requirement according to the wavelength label frequency and/or the attribute information, and comparing the optical network configuration requirement with configuration information sent by a network management system to judge whether network management information received by a current node is abnormal.

13. The method as claimed in claim 12, wherein the attribute information comprises at least one of the following: width of the channel, location of the channel, whether the channel has subcarriers, distribution of the subcarriers, source address, destination address, modulation format, subcarrier multiplexing mode and signal rate.

14. The method as claimed in claim 13, wherein sending the wavelength label frequency and/or the attribute information comprises:
sending the wavelength label frequency and/or the attribute information through a wavelength label channel.

15. An apparatus for monitoring a Reconfigurable Optical Add Drop Multiplexer (ROADM) optical network, comprising a hardware processor, configured to perform programming units stored in a memory, wherein the programming units comprise:
an acquisition unit, which is configured to acquire, from an optical signal, a wavelength label frequency or the wavelength label frequency and attribute information of a channel used for transmitting the optical signal; and
a monitoring unit, which is configured to monitor the ROADM optical network according to the wavelength label frequency or according to the wavelength label frequency and the attribute information;
wherein the monitoring unit comprises at least one of the following: a first monitoring component, which is configured to judge whether there is an optical signal misconnection on a path of the ROADM optical network according to the wavelength label frequency and/or the attribute information; a second monitoring component, which is configured to detect, at where the optical signal is dropped, whether a coherent receiver matches an optical channel of the dropped optical signal according to the wavelength label frequency and/or the attribute information; a third monitoring component, which is configured to generate an optical network configuration requirement according to the wavelength label frequency and/or the attribute information, and compare the optical network configuration requirement with configuration information sent by a network management system to judge whether network management information received by a current node is abnormal.

16. The apparatus as claimed in claim 15, wherein the attribute information comprises at least one of the following: width of the channel, location of the channel, whether the channel has subcarriers, distribution of the subcarriers, source address, destination address, modulation format, subcarrier multiplexing mode and signal rate.

17. The apparatus as claimed in claim 15, wherein the programming units further comprise:
a transmitting unit, which is configured to transmit the attribute information on a wavelength label channel, before the acquisition unit acquires, from the optical signal, the wavelength label frequency and/or the attribute information of the channel used for transmitting the optical signal.

18. An apparatus for monitoring a Reconfigurable Optical Add Drop Multiplexer (ROADM) optical network, comprising: a hardware processor, configured to perform programming units stored in a memory, wherein the programming units comprise:
a loading unit, which is configured to load, in an optical signal, a wavelength label frequency and attribute information of a channel used for transmitting the optical signal;
a sending unit, which is configured to send the wavelength label frequency and/or the attribute information, wherein the wavelength label frequency and the attribute information is used for monitoring the ROADM optical network;
wherein monitoring the ROADM optical network according to the wavelength label frequency and/or the attribute information comprises at least one of the following: judging whether there is an optical signal misconnection on a path of the ROADM optical network according to the wavelength label frequency and/or the attribute information; detecting, at where the optical signal is dropped, whether a coherent receiver matches an optical channel of the dropped optical signal according to the wavelength label frequency and/or the attribute information; generating an optical network configuration requirement according to the wavelength label frequency and/or the attribute information, and comparing the optical network configuration requirement with configuration information sent by a network management system to judge whether network management information received by a current node is abnormal.

19. The apparatus as claimed in claim 18, wherein the attribute information comprises at least one of the following: width of the channel, location of the channel, whether the channel has subcarriers, distribution of the subcarriers, source address, destination address, modulation format, subcarrier multiplexing mode and signal rate.

20. The apparatus as claimed in claim 18, wherein the sending unit is configured to send the wavelength label frequency and/or the attribute information through a wavelength label channel.

21. A system for monitoring a Reconfigurable Optical Add Drop Multiplexer (ROADM) optical network, comprising the apparatus for monitoring the ROADM optical network as claimed in any one of claims 15 to 17 and the apparatus for monitoring the ROADM optical network as claimed in any one of claims 18 to 20.

* * * * *